United States Patent
Andersson

(10) Patent No.: US 9,879,791 B2
(45) Date of Patent: Jan. 30, 2018

(54) SWING CHECK VALVE

(71) Applicant: Flomatic Corporation, Glens Falls, NY (US)

(72) Inventor: Allan Bo Andersson, Cambridge, NY (US)

(73) Assignee: FLOMATIC CORPORATION, Glen Falls, NY (US)

( * ) Notice: Subject to any disclaimer, the term of this patent is extended or adjusted under 35 U.S.C. 154(b) by 148 days.

(21) Appl. No.: 14/807,009

(22) Filed: Jul. 23, 2015

(65) Prior Publication Data

US 2017/0023141 A1    Jan. 26, 2017

(51) Int. Cl.
*F16K 15/03* (2006.01)
*F16K 27/02* (2006.01)

(52) U.S. Cl.
CPC ........ *F16K 15/033* (2013.01); *F16K 27/0227* (2013.01)

(58) Field of Classification Search
CPC ............................ F16K 27/0227; F16K 15/033
USPC ................................... 137/527, 529; 267/168
See application file for complete search history.

(56) References Cited

U.S. PATENT DOCUMENTS

| 5,794,655 A | * | 8/1998 | Funderburk | .......... F16K 15/033 |
| | | | | 137/454.6 |
| 6,050,294 A | | 4/2000 | Makowan | |
| 6,659,126 B2 | * | 12/2003 | Dunmire | ................ E03C 1/106 |
| | | | | 137/271 |

OTHER PUBLICATIONS

Dezurik, Apco Rubber Flapper Swing check Valves, Bulletin 100, Sep. 2014, 8 pages.
Dezurik, Apco CRF-100 Rubber Flapper Swing Check Valves, Instruction D12007, Dec. 4, 2012, 14 pages.

* cited by examiner

*Primary Examiner* — Craig Schneider
*Assistant Examiner* — P. Macade Nichols
(74) *Attorney, Agent, or Firm* — Heslin Rothenberg Farley & Mesiti P.C.

(57) ABSTRACT

A swing check valve with a combination of a flapper and a spring return mechanism is provided. The spring return mechanism includes a spring housing removeably coupled to a valve cover affixed to a valve body. The spring return mechanism also include at least two springs separated by a spring pivot guide for engaging the flapper to bias the flapper in the closed position against a valve seat.

14 Claims, 2 Drawing Sheets

SWING CHECK VALVE

BACKGROUND OF THE INVENTION

The present invention generally relates to check valves. More particularly, the present invention relates to swing check valves including a flapper disc in combination with a spring assembly.

Check valves having a closure mechanism consisting of a resilient disc are commonly used in the water and waste water industry to prevent reverse flow in such systems. Typically, these resilient disc check valves have a disc that is mounted within a valve body at a forty five degree angle with respect to the flow path when in the closed position. The disc includes a hinge which is typically integrally molded to the disc and rigidly held in place in the valve body. The resilient disc typically pivots about thirty five degrees to an open position to provide a full flow area or near full flow area. The thirty five degree span of movement is preferred because it provides a short closing stroke which avoid a slamming of the valve in a closed position.

A spring has been used as a return element and are desirable because it prevents the occurrence of valve slam and water hammer by biasing the disc into the closed position before the flow reverses in the pipe. In contrast, if the flow reverses in the pipe before the disc is in the fully closed position, the reverse flow will slam the disc into the seat and violent forces within the pipe and noise will result. The sudden stoppage of the reverse flow can cause the phenomenon known as water hammer in the pipe. Spring return mechanisms are often provided with resilient check valves. Also, pumping applications with high head, surge tanks or multiple pumps have long proved a challenge to operators trying to minimize line surges resulting from slamming check valves. The surge force or water hammer is proportional to the pipe flow velocities and the resulting reverse flow. For example, every one foot per second change in flow velocity theatrically creates a line pressure surge of fifty-four pounds per square inch ("psi") above the static system pressure. However the currently available spring mechanisms are not easily removeable, cannot be fine-tuned in the field, arecostly to fabricate and do not minimize friction loses caused by the hydraulic conditions.

Thus, a need exists for an adjustable spring closing mechanism to close a check valve to minimize the damage caused by the reverse flow and reduce the pipe line surge or water hammer.

SUMMARY OF THE INVENTION

The shortcomings of the prior art are overcome and additional advantages are provided through use of a swing check valve constructed in accordance with one or more principles of the present invention. The swing check valve constructed in accordance with one or more aspects of the present invention may be used, for example, in line with pipes in the water and waste water industry. Additionally, other uses may be made of the invention that fall within the scope of the claimed invention but which are not specifically described below.

The present invention provides, in a first aspect, a swing check valve including a valve body, a valve cover, a flapper and a spring assembly. The valve body includes a top opening, an inlet and an outlet and defining a flow path therebetween. The top opening of the valve body is configured to allow access to the main portion. The valve body further includes a main portion and a valve seat defined in the main portion between the inlet and the outlet. The valve cover covers the top opening of the valve body and is removeably attached to the valve body. The flapper pivotably hinges within the main portion of the valve body between an open position to a closed positon positioned against the valve seat. In one embodiment, the flapper is pivotably hinged to the valve cover. The spring assembly includes a spring housing removeably attached to the cover and a spring guide pivotably coupled to the flapper. The spring assembly further includes a first spring positioned within the spring housing, a second spring extending between the spring guide and a spring pivoting guide. The spring pivoting guide is positioned within the spring housing between the first spring and the second spring. The flapper is biased into the closed position by the spring assembly.

In another aspect of the present invention, the first spring and the second spring are different, having different compression loads.

In another aspect of the present invention, the spring assembly may include two or more springs and a spring pivoting guide positioned between the springs within the spring housing.

These, and other objects, features and advantages of this invention will become apparent from the following detailed description of the various aspects of the invention taken in conjunction with the accompanying drawings.

BRIEF DESCRIPTION OF THE DRAWINGS

One or more aspects of the present invention are particularly pointed out and distinctly claimed as examples in the claims at the conclusion of the specification. The foregoing and objects, features and advantages of one or more aspects are apparent from the following detailed description taken in conjunction with the accompanying drawings in which:

Figure 1:
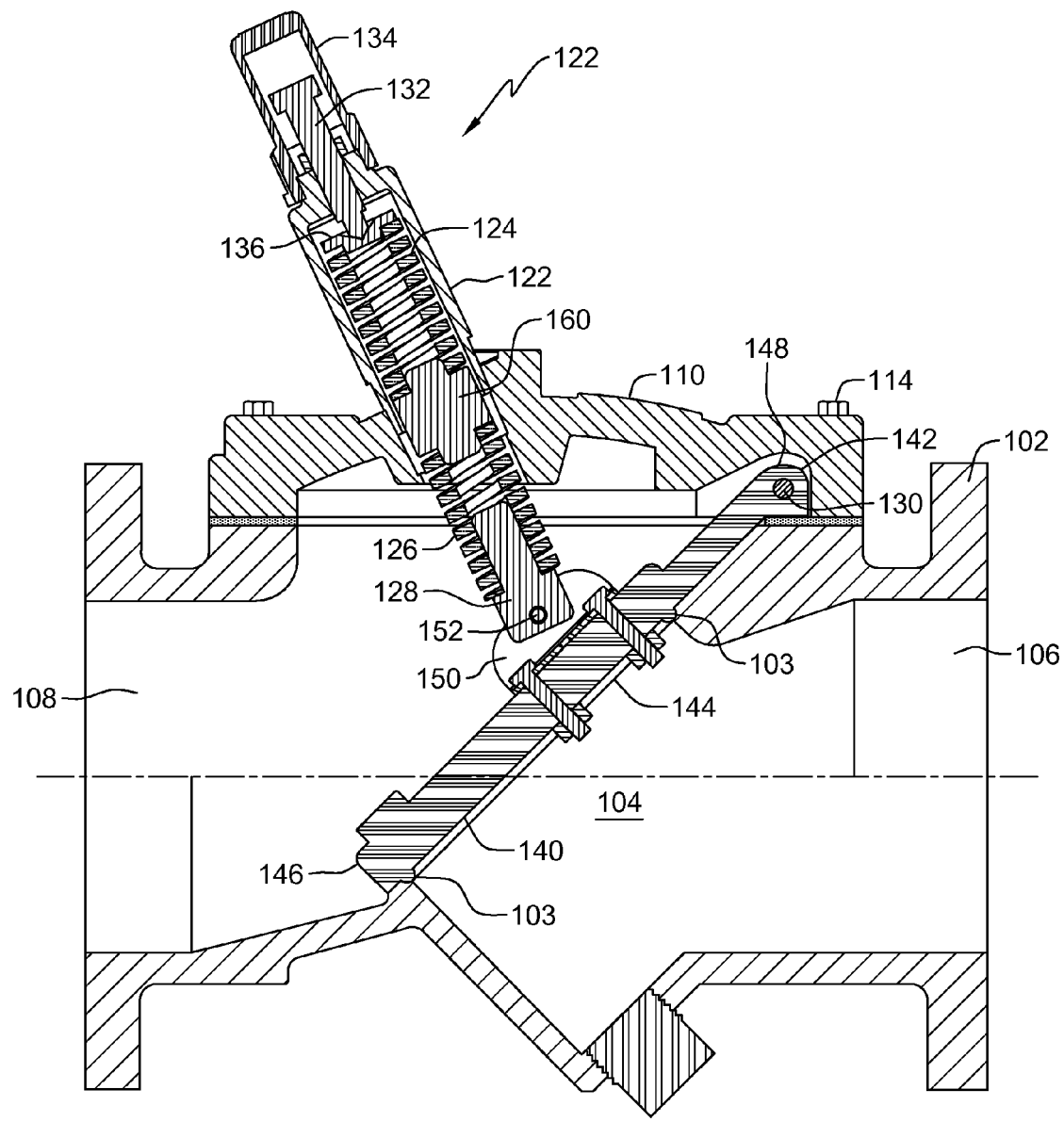
FIG. 1 depicts a cross-sectional view of a swing check valve constructed in accordance with one or more aspects of the present invention.
Figure 2:
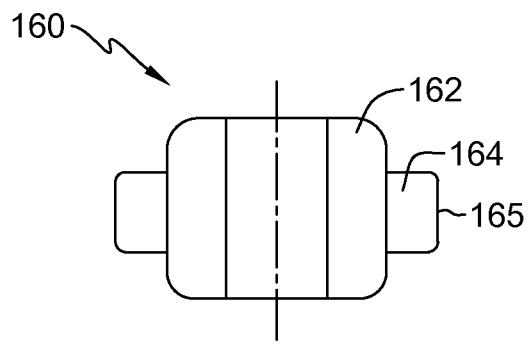
FIG. 2 depicts one example of a spring pivot guide constructed in accordance with one or more aspects of the present invention.
Figure 3:
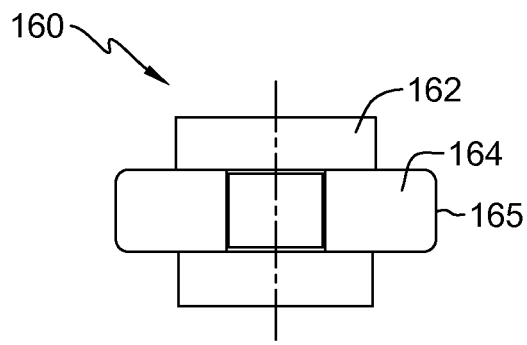
FIG. 3 depicts one example of a spring pivot guide constructed in accordance with one or more aspects of the present invention.
Figure 4:
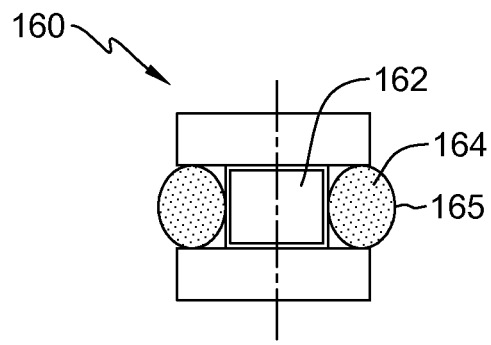
FIG. 4 depicts one example of a spring pivot guide constructed in accordance with one or more aspects of the present invention.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood that the invention is not necessarily limited to the particular embodiments illustrated herein.

DETAILED DESCRIPTION OF THE INVENTION

For purposes of promoting an understanding of the principles of a swing check valve designed and constructed in accordance with one or more aspects of the present invention, reference will now be made to the embodiments, or examples, illustrated in the drawings and specific language will be used to describe these. It will nevertheless be understood that no limitation of the scope of the invention is thereby intended. Any alterations and further modifications in the described embodiments, and any further applications of the principles of the invention as described herein are contemplated as would normally occur to one skilled in the art to which the swing check valve invention relates.

Presented herein is a swing check valve comprising, in one embodiment, multiple features that may be integrated into a swing check valve to, for example, minimize friction losses and permit fine tuning of a spring assembly based on hydraulic conditions in the field. Generally, in one aspect, a swing check valve constructed in accordance with one or more aspects of the present invention includes multiple springs separated by a spring pivoting guide that biases a flapper disc in a closed position against a valve seat and minimizes water damage and valve slamming during reverse flow. In one aspect of the present invention, the multiple springs may be the same type of spring or different, and may be inserted into a spring housing that is releasably attached to a valve body or a cover affixed to a valve body.

By way of example, FIG. 1 depicts a swing check valve 100 constructed in accordance with one or more aspects of the present invention. Swing check valve 100 depicted in FIG. 1 includes a valve body 102, a valve cover 110, a spring assembly 120 and a valve 140. Valve body 102 includes an inlet 106, an outlet 108, and a central or main portion 104. Main portion 104 defines a flow path for, for example, water and waste water to flow between inlet 106 and outlet 108. Main portion 104 also includes a top opening where cover 110 is removeably affixed thereto by, for example, bolts 114. Valve body 102 includes a valve seat 103 in main portion 104.

Swing check valve 100 also includes a flapper 140 that includes a proximal end 142, a distal end 146 and a central portion 144. Proximal end 142 of flapper 140 is connected to a pin 148 for pivotable rotating flapper 140 within main portion 140 of valve body 102 from a closed position against the valve seat 103 to an open position. Flapper 140 swings away from the valve seat 103 formed within main portion 104 of the valve body to allow flow from inlet 106 to outlet 108, and returns to valve seat 103 when upstream flow is stopped to prevent backflow. In one example, flow from a pump opens flapper 140 and, when the pump is shut off, backflow pressure (with assistance from spring assembly 120) pushes flapper 140 to close against valve seat 103. Flapper 140 may be constructed from, for example, synthetic rubber surrounding a steal disc for strength or a resilient polymer material.

Flapper 140 is biased into the closed position by spring assembly 120. Spring assembly 120 includes a spring guide 128 pivotably mounted to a flapper bracket 150 by a pivot pin 152. Flapper bracket 150 may be permanently affixed to flapper 140. Spring assembly 120 also includes a spring housing 122. In one aspect of the present invention, spring housing 122 is removably affixed to cover 110 without the need for removing the valve cover 110 from valve body 102. In one example, spring housing 122 may be screwed directly into valve cover 110. By enabling spring housing 122 to be removed from cover 110, service of the springs and cleansing of valve body 12 may be accomplished without having to completely remove cover 110 from valve body 102.

Spring assembly 120 also may include two springs 124 and 126 separated by a spring pivot guide 160. First spring 124 is inserted into a central portion of spring housing 122 followed by spring pivot guide 160 and second spring 126. Second spring 126 is also received by spring guide 128 pivotably attached to flapper bracket 150 of flapper 140 by hinge pin 130. Spring pivoting guide 160 allows first spring 124 to be guided and centered in spring housing 122 during normal valve operation. Spring pivot guide 160 allows second spring 126 to flex to the arc of flapper 140 movements based on the hinged relationship between spring guide 128 and flapper bracket 150. Adjustment of the spring force on valve flapper 140 is the result of the combination of the movement of both first and second springs 124, 126 with the guidance of spring pivot guide 160.

Spring assembly 120 may also include a spring adjustment mechanism comprising a cap 134 removeably affixed to spring housing 122 and a spring adjusting screw 132 affixed to a spring button 136. Spring adjusting screw 132 may be accessed by removing cap 134 from spring housing 122. By turning spring adjusting screw 132 clockwise, the compressive load on first and second spring 124 and 126 from spring button 136 will increase and apply more pressure on flapper 140 to cause flapper 140 to close faster and reduce slam. Turning spring adjusting screw 132 counterclockwise results in a decrease of pressure of flapper 140, or decrease compression load on first and second springs 124 and 126, that could minimize head loss and increase flow rate.

In one embodiment, first spring 124 is the same as second spring 126. In alternative embodiments, first spring 124 and second spring 126 are different. In one aspect of the present invention, the use of multiple springs 124, 125 provides the ability to fine tune the compression load to adjust to the desired cracking pressure of swing check valve 100 which will minimize friction losses based on the hydraulic conditions in the field. With spring housing 122 being removeably affixed to cover 110, springs 124 and 126 may be easily changed in the field to match the hydrodynamic conditions of a particular water or waste water system without having to remove valve body 102 or valve cover 110 from the pipe line.

Springs 124 and 126 may be provided and installed in any combination to make it easier for an operator to achieve the desired cracking pressure and valve disc closing speed. In one embodiment, springs 124 and 126 may be color coded depending on their compression loads. For example, springs 124 and 126 may come in green for light duty work with a range from 5 to 80 psi, blue for medium duty work with a range from 25 to 125 psi, and yellow for heavy duty work with a range from 30 to 300 psi. In one example, combination of turning spring adjustment screw 132 and selection of different combinations of first spring 124 and second spring 126 could fine tune the cracking pressure psi for a four inch swing check valve constructed in accordance with one or more aspects of the present invention.

The chart below provides some examples of various combinations of springs 124 and 126 using the color coded spring examples provided above being the same and different with the desired cracking pressure for a four inch sized swing check valve and an spring adjustment mechanism comprised of a screw. In certain environments, a desired cracking pressure is 2 psi.

CHART 1

4" Size Swing Check Valve Cracking Pressure (PSI)

| Adjustment Screw (Turns) | Green Spring Standard Spring (Light) | Green & Blue (Light & Medium) | Blue (Medium) | Blue & Black (Medium & Heavy) | Yellow (Heavy Duty) |
|---|---|---|---|---|---|
| All the way out | 0.5 | 0.8 | 1.0 | 1.5 | 2.0 |
| 2 turns | 1.0 | 1.3 | 1.5 | 3.3 | 5.0 |
| 3 turns | 1.3 | 1.6 | 2.0 | 3.3 | 5.5 |
| 4 turns | 1.5 | 2.0 | 2.5 | 4.8 | 7.0 |
| 5 turns | 2.0 | 2.5 | 3.0 | 5.5 | 8.0 |
| 6 turns | 2.3 | 2.9 | 3.5 | 6.5 | 9.5 |
| 7 turns | 2.3 | 3.1 | 4.0 | 7.0 | 10.0 |
| 8 turns | 2.8 | 3.6 | 4.5 | 7.8 | 11.0 |
| 9 turns | 3.0 | 4.0 | 5.0 | 8.5 | 12.0 |
| 10 turns | 5.0 | 5.3 | 5.5 | 9.3 | 13.0 |

Figure 5:
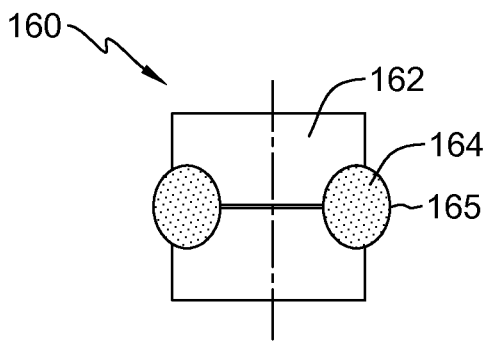
FIG. 5 depicts one example of a spring pivot guide constructed in accordance with one or more aspects of the present invention.

FIGS. 2-5 depict various embodiments of spring pivot guide 160. As depicted in FIGS. 2-5, spring pivot guide 160 may be include a guide body 162 and guide elements 164 having outer wear surfaces 165 facing and slidably received by the inner surface of spring housing 122. Guide body 162 of spring pivot guide 160 may be constructed of stainless steel, to prevent rusting and guide elements 164, or at least outer wear surfaces 165, may be constructed of stainless steel or other metal (FIG. 2), a composite material (FIG. 3), a ring made from, for example, stainless steel or other metal (FIG. 4) or roller bearing balls made from, for example, stainless steel or other metal (FIG. 5).

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A check valve, said check valve comprising:
    a valve body, said valve body including a top opening, an inlet and an outlet and defining a flow path therebetween, said valve body further including a main portion and a valve seat defined in the main portion between the inlet and the outlet, the top opening configured to allow access to the main portion;
    a valve cover, said valve cover covering the top opening of said valve body and removeably attached to said valve body;
    a flapper, said flapper pivotably hinged within the main portion of said valve body between an open position to a closed positon positioned against the valve seat; and
    a spring assembly, said spring assembly including a spring housing attached to said cover and a spring guide pivotably coupled to said flapper, said spring assembly further including a first spring positioned within the spring housing, a second spring extending between the spring guide and a spring pivot guide, the spring pivot guide positioned within the spring housing between the first spring and the second spring, wherein said flapper is biased into the closed position by the spring assembly.

2. The check valve of claim 1, wherein the first spring and the second spring include different compression loads.

3. The check valve of claim 1, wherein the spring housing of said spring assembly is screwed into said valve cover.

4. The check valve of claim 3, wherein the spring housing includes an outer surface having threads and said cover includes a hole having threads corresponding to the threads of the spring housing.

5. The check valve of claim 1, wherein said flapper is pivotably hinged to said cover.

6. The check valve of claim 1, wherein said spring assembly further includes a spring adjustment mechanism for increasing a compression load on the first and second springs.

7. The check valve of claim 1, wherein the second spring being capable of flexing to an arc corresponding to movement of said flapper between the open and closed positions.

8. The check valve of claim 1, wherein the spring pivot guide includes a guide body including an outer surface facing and slidably received by an inner surface of the spring housing.

9. The check valve of claim 1, wherein the spring pivot guide includes a guide body and at least one guide element having an outer wear surface facing and slidably received by the inner surface of the spring housing.

10. The check valve of claim 9, wherein the at least one guide element are a plurality of roller bearing balls.

11. The check valve of claim 10, wherein the at least one guide element is a metal ring.

12. The check valve of claim 9, wherein the at least one guide element is made from a composite material.

13. The check valve of claim 9, wherein the at least one guide element is made from stainless steel.

14. A check valve, said check valve comprising:
    a valve body, said valve body including a top opening, an inlet and an outlet and defining a flow path therebetween, said valve body further including a main portion and a valve seat defined in the main portion between the inlet and the outlet, the top opening configured to allow access to the main portion;
    a valve cover, said valve cover covering the top opening of said valve body and removeably attached to said valve body;
    a flapper, said flapper pivotably hinged within the main portion of said valve body between an open position to a closed positon positioned against the valve seat; and
    a spring assembly, said spring assembly including a spring housing removeably attached to said cover and a spring guide pivotably coupled to said flapper, said spring assembly further including a first spring positioned within the spring housing, a second spring extending between the spring guide and a spring pivot guide, the spring pivot guide positioned within the spring housing between the first spring and the second spring, wherein said flapper is biased into the closed position by the spring assembly.

\* \* \* \* \*